Dec. 14, 1948.         C. C. WATSON         2,456,163

HYDROGEN METER

Filed June 20, 1945

Inventor:
Charles C. Watson

By: Lee J. Gary

Attorney

Patented Dec. 14, 1948

2,456,163

UNITED STATES PATENT OFFICE 2,456,163

HYDROGEN METER

Charles C. Watson, Evanston, Ill., assignor to Universal Oil Products Company, Chicago, Ill., a corporation of Delaware Application June 20, 1945, Serial No. 600,553

8 Claims. (Cl. 73—23)

This invention relates to a meter for measuring hydrogen concentration. A meter of this type is particularly useful in various operations for determining the percentage of hydrogen present in a given confined zone or in a given flow stream. The operation of the apparatus is based on employing a diaphragm or wall permeable to hydrogen such that the pressure of hydrogen in a zone separated from the main gaseous flow stream by the hydrogen permeable wall may be measured and compared to the total pressure of the particular gaseous measure. In accordance with the law of partial pressures, the pressure exercised by each component in a gaseous mixture is proportional to its concentration in the mixture, and the total pressure of a gas is equal to the sum of the partial pressures of its components. Thus the pressure built up in the aforesaid separated zone is a measure of the hydrogen concentration in the main gaseous stream.

The apparatus of this invention is somewhat similar in operation to an osmotic pressure measuring device. However, this device is provided with the means to measure the partial pressure of hydrogen in a gaseous mixture by using a hydrogen permeable metallic wall, such that the device would not be suitable for the passage of liquid materials. Thermal types of meters have been used for determining the quantity of a particular gas in a flow stream, however, these thermal meters operate on an entirely different principle than the one of this invention. In general, thermal meters are dependent upon knowing the specific heat of the particular gas being measured and accurately measuring the rate of heat supplied to or taken from the gas flow stream.

The specific object of this invention is to provide a device which will give reasonably accurate hydrogen concentration readings and be comparatively simple in its method of operation, as well as in its construction.

It is generally known and proven that palladium and platinum are quite permeable to hydrogen, at least to a far greater degree than for other gases or vapors normally encountered. It is also known that these particular metals are much more permeable to hydrogen at raised temperatures. It is, therefore, advantageous to have the permeable wall or partition heated by some means in order to provide a rapid transfer of hydrogen therethrough and furnish a partial pressure reading without there being a considerable lag involved. A very simplified form of the apparatus may be made without internally constructed heating means. However, the device without an internal heating means for the hydrogen permeable wall, should preferably be used in a hot gaseous flow stream so that the wall or diaphragm will be automatically heated by the gases. Of course, where lag or delay in obtaining a reading is not objectionable, then the simplified form of the apparatus may be used to obtain a hydrogen partial pressure reading at lower temperatures.

In a simple form of the device a tubular housing is employed having a hydrogen permeable partitioning means fixed therein, such that a separated or isolated space is provided, between the partitioning and housing, to accommodate a small volume of hydrogen which will permeate thereto. Inlet and outlet connections for the main gas stream or a sample stream may be provided at each end of the housing. A single nozzle, for a pressure gauge connection, is provided through the housing to connect with the hydrogen receiving chamber such that the partial pressure reading obtained on a gauge connected to this nozzle may be compared to that of the total pressure reading of the gaseous mixture flowing through the device. The ratio of the partial pressure reading to the total pressure of the reading will provide a measure of the percentage of hydrogen within the given stream. Air cooling fins may be provided on the tubular housing to prevent over heating of the housing of the apparatus, when subjected to excessively high gas temperature. Also, corrugation or other suitable expansion means in the platinum or palladium wall are provided in order that differential expansion be taken care of between the partitioning wall and the enclosing housing.

In another embodiment of the invention a more elaborate and useful form is provided which includes means for electrically heating the internal palladium or platinum partitioning sleeve. The general form of the device may be similar to the simplified form, with the addition of an insulated electrode provided to pass through the housing and to connect with the internally placed partitioning sleeve. The ends of the sleeve are attached to the housing, thus by grounding the housing, electrical resistance heating may be set up within the hydrogen permeable sleeve. With this electrical heating means, a raised temperature permeable sleeve is provided, such that the meter may be used to obtain relatively rapid hydrogen penetration when used for measuring a cool gaseous mixture; in other words, the metering device need not be limited to being used in a hot gaseous stream. Water cooling means may also be provided in lieu of the air cooling fins, if it is so desired. This is accomplished by providing a cylindrical water jacket around the housing and the hydrogen receiving chamber of the device.

The features of the invention will be more apparent with reference to the accompanying diagrammatic drawing and the description thereof. Two forms of the apparatus are shown in the drawing.

Figure 1:
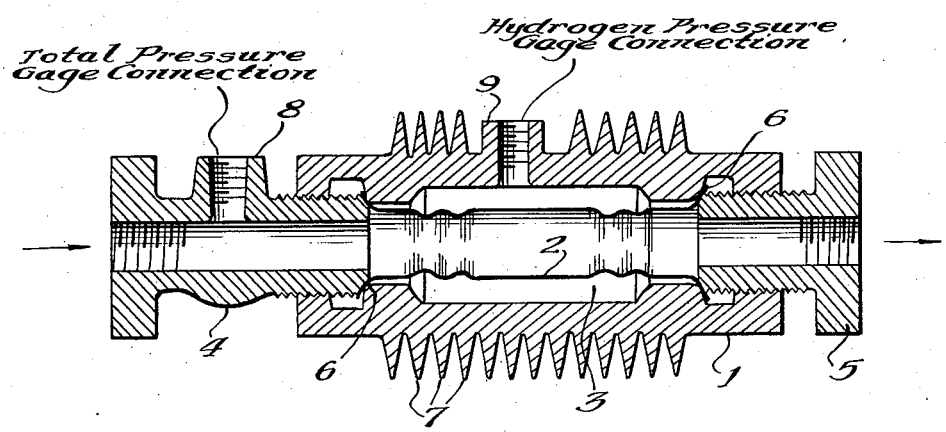
Figure 1 shows a diagrammatic cross sectional view of a simplified form of the invention.

Referring now to Figure 1, the housing 1 is provided to accommodate a cylindrical, hydrogen permeable sleeve 2, and an annular zone 3 around the sleeve 2 into which hydrogen will permeate from the flow path within the interior of the sleeve 2. This sleeve 2 is made of palladium or platinum, either of which is permeable to hydrogen, and is sealed at each end to the tubular housing 1 by means of threaded bushings 4 and 5. These bushings fixedly seal the flared ends of the sleeve 2 to seats 6 which are provided within the housing member 1. Of course, other means than this particular method shown may be used to fix or seal the hydrogen permeable sleeve 2 to the housing 1, also, the permeable partitioning means 2 and the hydrogen chamber 3 need not necessarily be cylindrical in form.

The cylindrical sleeve 2 is provided with bellows type of corrugations in order to have means to accommodate the differential expansion which will occur between this sleeve 2 and the housing 1 when flow streams of hot gaseous mixtures pass therethrough. Cooling fins 7 are provided on the outside of the housing 1, to aid in dissipating excess heat from the device. The threaded nozzle 8 on the end bushing 4 provides means for attaching a pressure reading gauge to obtain the pressure of the given gaseous mixture, while the threaded nozzle 9 on the housing 1 provides means for attaching a pressure gauge to obtain the partial pressure of the hydrogen within zone 3. A percentage measurement of the hydrogen concentration in a given stream can thus be obtained directly from the ratio of partial pressure of hydrogen in the stream to the total pressure of that stream.

Figure 2:
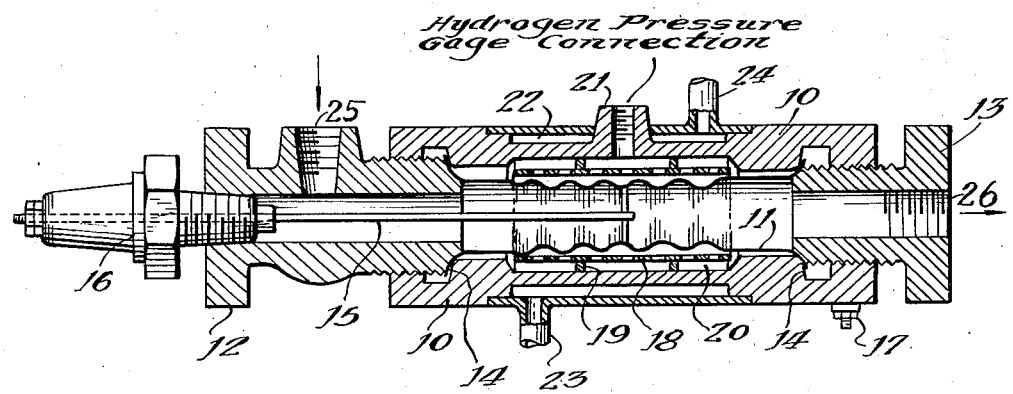
Figure 2 shows a diagrammatic cross sectional drawing of another form of the apparatus which includes electrical heating means for the internal hydrogen permeable wall, and water cooling means for the housing.

In Figure 2 of the drawing a different form of the device is shown with electrical resistance heating means provided for the hydrogen permeable sleeve. The housing 10 is tubular in shape having a cylindrical hydrogen permeable sleeve or tube 11 placed internally within and fixedly sealed at each end by threaded bushings 12 and 13 and internal seats 14 provided at each end of the housing 10. The sleeve 11 is provided with an electrode 15 connected to the center thereof, such that electrical resistance heating will be set up in the sleeve. The electrical circuit through the sleeve 11 is made by the use of a "spark-plug" type of electrode connector 16, which has a porcelain insulator around the electrode 15. The circuit to the sleeve 11 will be completed by the ground connection 17 to the housing 10.

A perforated sleeve 18 is provided around the tube 11, this perforated sleeve 18 serves to keep the hydrogen permeable tube 11 in alignment and prevent rupture due to adverse high temperature and pressure conditions. The sleeve 18 is also provided with non-conducting lugs 19 so that the electrical circuit through the permeable sleeve 11 will not be short-circuited at its center. A hydrogen receiving zone 20 is provided around the permeable sleeve 11 and within the housing 10. A pressure gauge connection nozzle 21 is provided connective with the hydrogen receiving zone 20.

Surrounding the main body of the housing 10 and the hydrogen zone 20, an annular cooling water zone 22 is provided to keep the walls of the housing cool. The cooling water is passed to and discharged from this cooling zone 22 by means of the conduit connections 23 and 24. Threaded conduit connections 25 and 26 are provided in each of the end bushings 12 and 13 and will serve to connect this metering device with the main gaseous stream or sample stream, as the case may be.

This latter preferred form of the invention has an advantage in that it may be used with a cool gaseous mixture, since the sleeve 11 has its own independent electrical heating means. The cooling for the housing 10 of course need not be accomplished by the water jacket 22; air cooling fins may be used, if it is so desired, similar to those provided in the simplified form of the invention in Figure 1.

A pressure gauge connection for obtaining the pressure of the gaseous mixture is not provided in the specific form of the device shown, however, the gauge connection may be provided in the conduit (not illustrated) which leads to this metering apparatus.

In operation, the device may be connected directly to the main conduit passing the hydrogen containing gas stream or it may be connected to a sample stream. In cases of excessively high pressures, which may rupture the palladium or platinum sleeve that is provided within the apparatus, it will be advisable to reduce the pressure of the gas stream passing through the sample line. The sleeve 11 being permeable to hydrogen allows the partial pressure of the hydrogen to build up in the zone 20 and provide a pressure reading on a gauge (not shown) which is connected to this zone by way of the connection 21. As previously noted the percent of hydrogen in the particular stream is obtained directly from the partial pressure reading and the total pressure reading on the sample stream. For example, assume the pressure of the gaseous mixture to be 200 pounds per square inch, absolute, and the partial pressure of the hydrogen to be 20 pounds per square inch, absolute, then the ratio 20/200=1/10, readily and quickly indicates that there is a 10% concentration of hydrogen in the particular stream.

In many processing operations it is necessary to know frequently or continuously the hydrogen content of the processing stream, so that an apparatus of this type becomes particularly useful and valuable. Many factors enter into the construction and operation of a device of this type; however, the devices as shown and described, properly operated, will provide reasonably accurate hydrogen concentration measurements.

It is of course not intended to limit the device of this invention to the two forms shown, as it is obvious that various mechanical or constructional changes may be incorporated and still come within the scope of this invention.

I claim as my invention:

1. An apparatus for measuring hydrogen concentration in a gaseous mixture which comprises a tubular housing having an inlet at one end and an outlet at the opposite end thereof for said gaseous mixture, cooling means around the exterior of the said housing, a cylindrical and expansible hydrogen permeable sleeve placed concentrically within said housing, said cylindrical sleeve having its ends sealed to the inner wall of said housing and forming an annular hydrogen receiving space with the wall of said housing, and a nozzle connecting to said hydrogen receiving space suitable for attaching a pressure indicating means.

2. An apparatus for measuring hydrogen concentration in a gaseous mixture which comprises a tubular housing having an inlet at one end and an outlet at the opposite end thereof for said gaseous mixture, air cooling fins around the exterior of said housing, a cylindrical and expansible palladium sleeve placed concentrically within said housing, said palladium sleeve having its ends sealed to the inner wall of said housing and forming an annular hydrogen receiving space with the wall of said housing, and a nozzle through the side of said housing connecting to said hydrogen receiving space suitable for attaching a pressure indicating means.

3. An apparatus for measuring hydrogen concentration in a gaseous mixture which comprises a tubular housing having an inlet at one end and an outlet at the opposite end thereof for said gaseous mixture, air cooling fins around the exterior of said housing, a cylindrical and expansible platinum sleeve placed concentrically within said housing, said platinum sleeve having its ends sealed to the inner wall of said housing and forming an annular hydrogen receiving space with the wall of said housing, and a nozzle through the side of said housing connecting to said hydrogen receiving space suitable for attaching a pressure indicating means.

4. An apparatus for measuring hydrogen concentration in a gaseous mixture which comprises a tubular housing having an inlet at one end and an outlet at the opposite end thereof for said gaseous mixture, cooling means around the exterior of said housing, a cylindrical and expansible hydrogen permeable sleeve placed concentrically within said housing, said cylindrical sleeve having its ends sealed to the inner wall of said housing and forming an annular hydrogen receiving space with the wall of said housing, a perforated reinforcing and aligning tube around said hydrogen permeable sleeve within said hydrogen receiving space, a nozzle connecting to said hydrogen receiving space suitable for attaching pressure indicating means, and electrode connections to said hydrogen permeable sleeve to complete an electrically resistance heating circuit through said sleeve.

5. An apparatus for measuring hydrogen concentration in a gaseous mixture which comprises a tubular housing having an inlet at one end and an outlet at the opposite end thereof for said gaseous mixture, a jacket for liquid cooling around the exterior of said housing, a cylindrical and expansible palladium sleeve placed concentrically within said housing, said palladium sleeve having its ends sealed to the inner wall of said housing and forming an annular hydrogen receiving space with the wall of said housing, a perforated reinforcing and aligning tube around said palladium sleeve within said hydrogen receiving space, a nozzle connecting to said hydrogen receiving space suitable for attaching pressure indicating means, an insulated electrode connecting with the center of said palladium sleeve from the exterior of said housing, and an electrical ground connection on the body of said housing.

6. An apparatus for measuring hydrogen concentration in a gaseous mixture which comprises a tubular housing having a gas inlet at one end and an outlet at the opposite end thereof for said gaseous mixture, a jacket for liquid cooling around the exterior of said housing, a cylindrical and expansible platinum sleeve placed concentrically within said housing, said platinum sleeve having its ends sealed to the inner wall of said housing and forming an annular hydrogen receiving space with the wall of said housing, a perforated reinforcing and aligning tube around said platinum sleeve within said hydrogen receiving space, a nozzle connecting to said hydrogen receiving space suitable for attaching pressure indicating means, an insulated electrode connecting with the center of said platinum sleeve from the exterior of said housing, and an electrical ground connection on the body of said housing.

7. An apparatus for measuring hydrogen concentration in a gaseous mixture which comprises a tubular housing having an inlet at one end and an outlet at the opposite end thereof for said gaseous mixture, a cylindrical and expansible hydrogen permeable sleeve placed concentrically within said housing, said cylindrical sleeve having its ends sealed to the inner wall of said housing and forming an annular hydrogen receiving space with the wall of said housing, and a nozzle connecting to said hydrogen receiving space suitable for attaching a pressure indicating means.

8. An apparatus for measuring hydrogen concentration in a gaseous mixture which comprises a tubular housing having an inlet at one end and an outlet at the opposite end thereof for said gaseous mixture, a cylindrical and expansible hydrogen permeable sleeve placed concentrically within said housing, said cylindrical sleeve having its ends sealed to the inner wall of said housing and forming an annular hydrogen receiving space with the wall of said housing, a perforated reinforcing and aligning tube around said hydrogen permeable sleeve within said hydrogen receiving space, a nozzle connecting to said hydrogen receiving space suitable for attaching pressure indicating means, and electrode connections to said hydrogen permeable sleeve to complete an electrically resistance heating circuit through said sleeve.

CHARLES C. WATSON.

REFERENCES CITED

The following references are of record in the file of this patent:

UNITED STATES PATENTS

| Number | Name | Date |
| --- | --- | --- |
| 1,721,977 | Sewerin | July 23, 1929 |
| 2,045,379 | Bennett | June 23, 1936 |
| 2,400,940 | McCollum | May 28, 1946 |

FOREIGN PATENTS

| Number | Country | Date |
| --- | --- | --- |
| 536,680 | Germany | Oct. 23, 1931 |
| 553,318 | Great Britain | May 17, 1943 |